United States Patent
Sarkar et al.

(10) Patent No.: US 12,476,291 B2
(45) Date of Patent: Nov. 18, 2025

(54) MAGNETIC FIELD-ASSISTED FAST CHARGING OF LITHIUM-ION BATTERIES

(71) Applicant: Iowa State University Research Foundation, Inc., Ames, IA (US)

(72) Inventors: Abhishek Sarkar, Ames, IA (US); Cajetan Ikenna Nlebedim, Ames, IA (US); Pranav Shrotiya, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 603 days.

(21) Appl. No.: 17/803,239

(22) Filed: Mar. 28, 2022

(65) Prior Publication Data
US 2022/0320608 A1 Oct. 6, 2022

Related U.S. Application Data

(60) Provisional application No. 63/207,958, filed on Apr. 1, 2021.

(51) Int. Cl.
*H01M 10/44* (2006.01)
*H01M 4/133* (2010.01)
*H01M 4/02* (2006.01)

(52) U.S. Cl.
CPC .......... *H01M 10/44* (2013.01); *H01M 4/133* (2013.01); *H01M 2004/027* (2013.01); *H01M 2220/20* (2013.01)

(58) Field of Classification Search
CPC ............. H01M 10/0525; H01M 10/44; H01M 2004/027; H01M 2220/20; H01M 4/133; H01M 4/587
See application file for complete search history.

(56) References Cited

U.S. PATENT DOCUMENTS

| | | | | |
|---|---|---|---|---|
| 9,479,007 B1* | 10/2016 | Jol | ............................. | H01F 1/44 |
| 2015/0147604 A1* | 5/2015 | Baba | ..................... | H01M 10/48 |
| | | | | 429/61 |
| 2019/0190010 A1* | 6/2019 | Ebner | ................. | H01M 4/0409 |
| 2022/0059829 A1* | 2/2022 | Bozorgi | ................ | H01M 4/485 |

FOREIGN PATENT DOCUMENTS

| | | | | |
|---|---|---|---|---|
| CN | 110429327 A | * | 11/2019 | |
| CN | 111048842 A | * | 4/2020 | ........ H01M 10/0525 |
| WO | WO-2019138418 A1 | * | 7/2019 | |

OTHER PUBLICATIONS

Machine translation CN111048842A (Year: 2020).*
Machine translation CN110429327A (Year: 2019).*
Anthony Barre et al, A review on lithium-ion battery ageing mechanisms and estimations for automotive applications, Journal of Power Sources, 241, pp. 680-689, 2013.

(Continued)

*Primary Examiner* — Victoria H Lynch

(57) ABSTRACT

Fast charging of a lithium-ion battery at 4C rate or 5C rate or more is improved by applying an external magnetic field relative to the battery to establish magnetic field lines that extend in a direction of primary movement of lithium ions toward the graphite anode during fast charging. Deleterious degradation of the graphite anode from repeated fast charging can be reduced or eliminated by practice of the invention.

18 Claims, 13 Drawing Sheets

(56) References Cited

OTHER PUBLICATIONS

Michael M. Thackeray et al, Electrical energy storage for transportation-approaching the limits of, and going beyond lithium-ion batteries, Energy & Environmental Science, 5, pp. 7854, 2012.

J.M. Tarascon et al., Issues and challenges facing rechargeable lithium batteries, Nature, vol. 414, pp. 359-367, Nov. 01.

Kang Shen et al, Magnetic Field-Suppressed Lithium DnDendrite Growth for Stable Lithium-Metal Batteries, Advanced Energy Material, 9, 1900260, 2019.

Jing Dong, Uniform lithium depostion driven by vertical magnetic field for stable lithium anodes, Solid State Ionics, 341, 115033, 2019.

M. Armand et al, Building better batteries, Nature, vol. 451, pp. 652-657, 2008.

Vinodkumar Etacheri et al, Challenges in the development of advanced Li-ion batteries: a review, Energy & Environmental Science, 4, 3243, 2011.

Julietta Billaud et al, Mganetically alinged graphite electrodes for high-rate performance Li-ion batteries, Nature Energy, vol. 1, 2016.

Yuanqi Huang et al, Mechanism of lithium electrodeposition in a magnetic field, Solid State Ionics, 345, 115171, 2020.

John B. Goodenough et al, The Li-ion Rechargeable Battery: A Perspective, Journal of the American Chemical Society, 135, p. 11670-1176, 2013.

J.S. Sander et al, High-performance battery electrodes via magnetic templating, Nature Energy, vol. 1, 2016.

Lin Ma et al, A systematic study on the reactivity of different grades of charged Li [NixMnyCoz]02 with electroyte at elevated temperatures using accelerating rate calorimetry, Journal of Power Sources, 327, pp. 145-150, 2016.

Chen-Xi Zu et al, Thermodynamic analysis on eneregy densities of batteries, Energy & Environmental Science, 4, 2614, 2011.

J. Vetter et al, Ageing mechanisms in lithium-ion batteries, Journal of Power Sources, 147, pp. 269-281, 2005.

Abhishek Sarkar et al, Magnetohydrodynamic Control of Interfacial Degradation in Lithium-ion Batteries for Fast Charging Applications, Applied Materials & Interfaces, 13, 4306-43614, Aug. 31, 2021.

Kang Shen et al, Recent progress of magnetic field application in lithium-based batteries, Nano Energy, 92, 106703, Nov. 9, 2021.

* cited by examiner

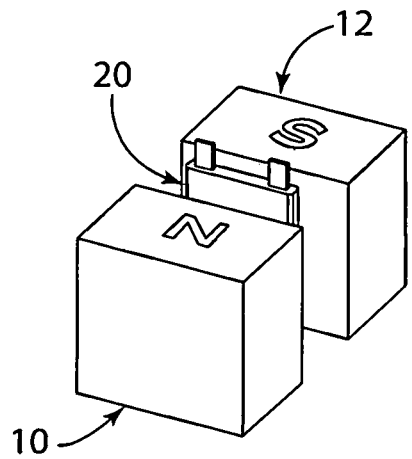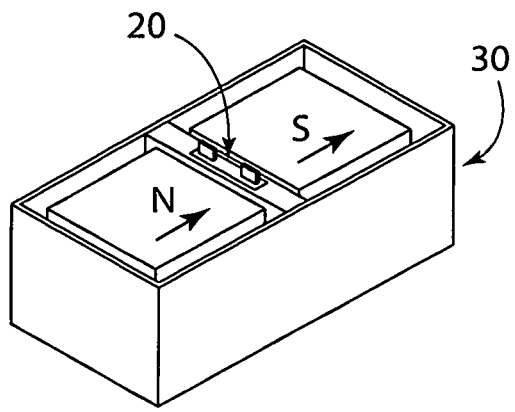
Fig. 1a  Fig. 1b
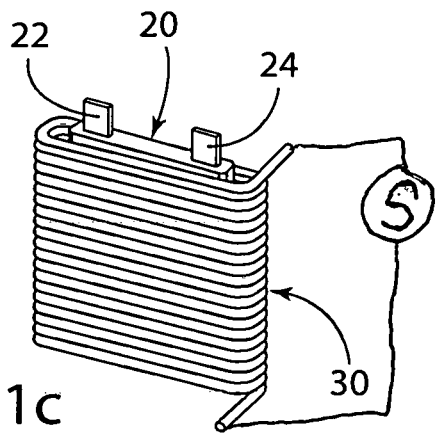
Fig. 1c
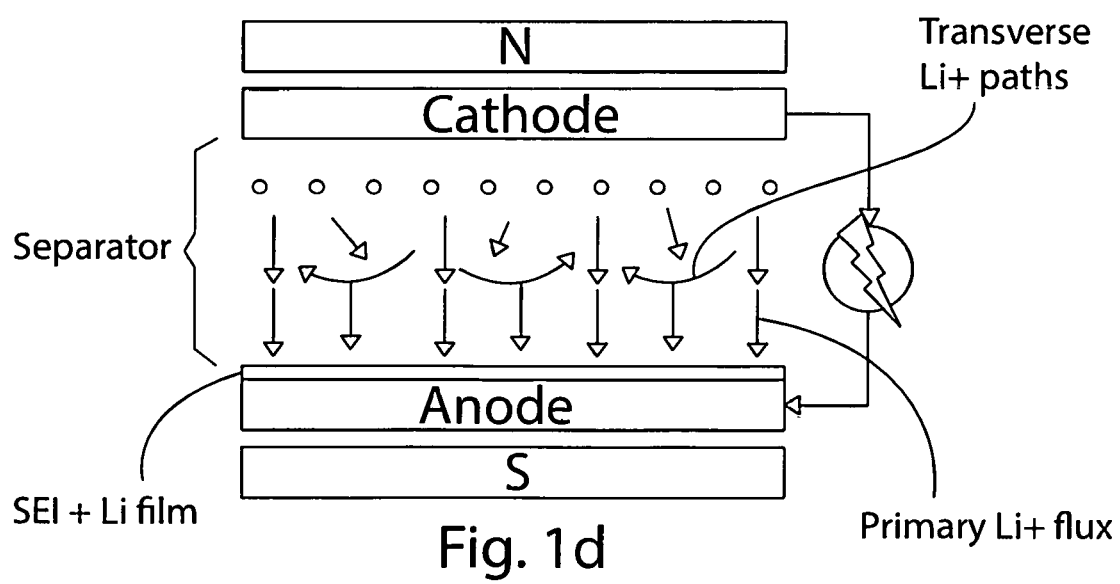
Fig. 1d

MAGNETIC FIELD-ASSISTED FAST CHARGING OF LITHIUM-ION BATTERIES

RELATED APPLICATION

This application claims benefit and priority of provisional application Ser. No. 63/207,958 filed Apr. 1, 2021, the entire disclosure and drawings of which are incorporated herein by reference.

CONTRACTUAL ORIGIN OF THE INVENTION

This invention was made with government support under Grant No. DE-AC02-07CH11358 awarded by the U.S. Department of Energy. The government has certain rights in the invention.

FIELD OF THE INVENTION

The present invention relates to the fast charging of lithium ion batteries and, more particularly, to application of an external magnetic field during fast charging of the battery in a manner that limits deleterious degradation at the anode during fast charging.

BACKGROUND OF THE INVENTION

The imminent need to develop sustainable energy storage solutions in the automobile and consumer electronics industries has substantially accelerated the demand for lithium-ion batteries. Meeting this need requires lithium-ion batteries that are capable of fast charging with reliable cyclic performance and long service life. Among the potential intercalation compounds for lithium-ion battery electrodes, graphite is the most widely used commercial anode material for over three decades. Graphite anodes are typically highly crystalline, hexagonally bonded layers of carbon atoms ($sp^2$ hybridized), stacked together by weak van der Waals interactions which allows lithium ions to intercalate in the interstitial positions between the stacks of graphene sheets. Despite other competing materials, graphite will remain the dominant anode material in the next few years with the global market of almost US$1 billion in 2019 and forecasted to exceed US$1.9 billion by 2024.

However, under fast charging conditions, lithium-ion batteries are subject to severe performance degradation resulting from the formation of solid-electrolyte interface (SEI) and lithium plating on graphite anodes. These ageing mechanisms (briefly discussed in the next two paragraphs) deteriorate electrochemical performance of lithium-ion batteries by irreversible extraction of active lithium from the electrolyte present in the battery, leading to capacity loss, poor columbic efficiency, increasing tendency of thermal runaway and/or severe structural damage to the electrode.

A major drawback of graphite electrodes is that they suffer from irreversible capacity loss due to the formation of the SEI layer, composed of lithium salts (organic and inorganic) on the surface of the anode particles. The ionically conducting but electronically insulating SEI layer is formed when the redox potential of the anode lies outside the potential range of the battery. During progressive cycling of the battery, the slow kinetics of the graphite anode leads to capacity loss due to the slow but continued evolution of the SEI layer that irreversibly consumes the active material of the electrolyte and increases the anodic surface's resistance.

During fast charging, convoluted diffusion pathways of the polymeric separator membrane typically present between the anode and cathode in a lithium-ion battery lead to non-uniform ionic flux and irregular hotspots of lithium concentration on the anode/separator interface. This leads to the onset of two severely deteriorating mechanisms at interfacial surface, i.e. lithium plating and film fracture at the anode surface. Graphite anodes are especially susceptible to metallic lithium plating due to the lower operating open-circuit voltage (OCV) range (about 1.0-0.01 V). The localized spikes in lithium concentration causes a rapid anodic potential decay, and the overpotential becomes <0 V (vs. Li/Li+) leading to electrodeposition of metallic lithium at anode/separator membrane interface. In addition to the resultant capacity loss, uncontrolled dendritic lithium growth could pierce the polymeric separator membrane leading to thermal runaway due to short-circuit between the electrodes—a safety concern. Another consequence of rapid lithiation is mechanical stresses induced on the electrode surfaces due to volumetric expansion (about 10.3%). The cyclic expansion of the electrode causes fatigue crack formation at the anode surface, which exposes new electrode surface to electrolyte which, in turn, contributes to SEI film evolution and loss of active lithium through repeated fracture and formation cycle.

Previous workers have been focused on application of the magnetohydrodynamic (MHD) effect on lithium metal anode batteries to improve uniformity in lithium deposition during charging since, in lithium metal batteries, the dendritic growth in lithium metal anodes occurs due to surface imperfections, which can be suppressed by surface polishing.

However, the surfaces of graphite anodes of lithium-ion batteries are inherently rough and porous which eliminates polishing as mechanism for suppressing plating.

Moreover, lithium metal anodes do not exhibit severe interfacial film fracture including the SEI layer at the anode surface due to their significantly lower volumetric strains compared to the graphite anode of lithium-ion batteries.

SUMMARY OF THE INVENTION

An object of the present invention is to provide method and apparatus for limiting the degradation in performance of lithium-ion batteries with an anode comprising graphite by coupling electrochemistry with electromagnetism during fast charging in a manner that recognizes the different morphology and physicochemical behavior of the anode comprising graphite of lithium-ion batteries (as opposed to the lithium metal anode of the lithium metal battery). Embodiments of the present invention involve the application of magnetohydrodynamic (MHD) forces during fast charging to limit the particular degradation associated with the graphite anode of a lithium-ion battery, providing a facile and novel route for fast charging that can limit deleterious degradation of the graphite anode.

An embodiment of the present invention involves applying a magnetic field to the battery in such a manner that magnetic field lines extend in the direction of primary $Li^+$ ion flux (ion transport) toward the anode during fast charging such as, for example, at 4C rate, typically 5C or more such as 6C or more, to limit deleterious degradation of the graphite anode.

Certain embodiments of the invention provide one or more permanent magnets and/or one or more electromagnets positioned relative to the lithium-ion battery in such a manner that magnetic flux lines extend in the direction of primary $Li^+$ ion flux or transport toward the anode to this end. These embodiments envision controlling the electromagnet using a conventional DC power source or AC power source to modulate the electromagnet current in a manner to provide at least one of a constant magnetic field, an alternating magnetic field, or a pulsed magnetic field during fast charging.

Practice of embodiments of the present invention is advantageous to reduce or eliminate deleterious degradation of the lithium-ion battery during fast charging and also can result in improvements in capacity as well as columbic efficiency of the battery.

Embodiments of the present invention can be practiced with respect to myriad types of lithium-ion batteries, including, but not limited to, those lithium-ion batteries for electronic devices such as cell phones, portable computers, etc.; EV vehicle batteries; and other electronic systems.

BRIEF DESCRIPTION OF THE DRAWINGS

FIGS. 1a-1b are schematic representations of a lithium-ion battery with application of external magnetic field applied by a pair of permanent bar magnets (FIG. 1a and FIG. 1b) and by electromagnet coil (FIG. 1c). FIG. 1d is a schematic representation of MHD forces creating a convective current on non-uniform lithium ion fluxes during fast charging by a charger (shown schematically) under an applied magnetic field. The separator between the anode and cathode and the SEI+Li interfacial film present on the graphite anode are illustrated with typical electrolyte being present at the anode/separator/cathode although not illustrated.

In FIGS. 2a-2e, the open circle data points (labelled dcB) are discharge capacity data with applied magnetic field as compared to open square data points for discharge capacity without magnetic field. The open circle data points (labelled ηB) are $\eta_{coulombic}$ data with magnetic field applied as compared to open square data points for $\eta_{coulombic}$ without magnetic field.

DETAILED DESCRIPTION OF THE INVENTION

Figure 1E:
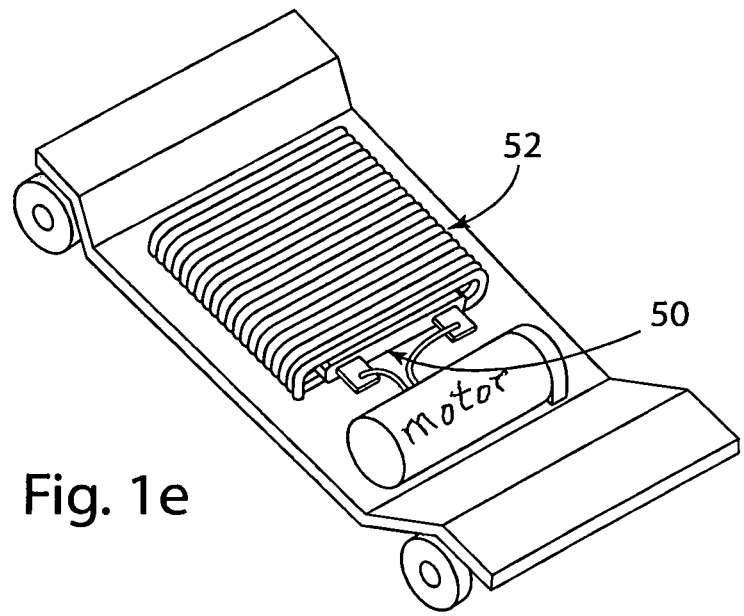
FIG. 1e schematically shows an electric vehicle (EV) having a lithium-ion battery pack and an electromagnet coil positioned around the periphery of the battery pack such that the magnetic field lines are substantially normal to the anode surfaces of the battery pack.
Figure 1F:
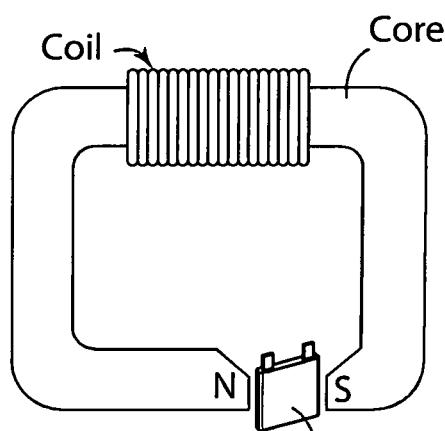
FIG. 1f shows a schematic of the C-shape core electromagnet with a pouch cell between poles of the electromagnet core.

Embodiments of the present invention combine electrochemistry with electromagnetism during fast charging of a lithium-ion battery with an anode comprising graphite to limit the degradation in performance of the battery during fast charging such as, for example, at 4C, typically at 5C or more, such as 6C or more, to limit deleterious degradation of the graphite anode. Practice of embodiments of the present invention not only can reduce or eliminate deleterious degradation at the graphite anode of the lithium-ion battery during fast charging but also can result in improvements in capacity as well as columbic efficiency of the battery as will become apparent from the Examples set forth below.

Embodiments of the present invention can be practiced with respect to lithium-ion batteries of various types and shapes such as including, but not limited to, a cylindrical lithium-ion battery where the anode/separator/cathode are cylindrically jelly-rolled to create the battery structure and where the magnetic field lines extend radially (i.e. normal) to the cylindrical anode surface during fast charging; a pouch lithium-ion battery where the anode/separator/cathode are prismatically jelly-rolled to create a prismatic battery structure and shape that are more rectangular than cylindrical) where the magnetic field lines extends normal to the anode surfaces, lithium-ion button battery; flat, thin, stacked anode/separator/cathode lithium-ion battery and any other types and shapes. In particular embodiments of the present invention offered for purposes of illustration and not limitation, embodiments can be employed to control the interfacial kinetics, limit anodic degradation and improve electrochemical performance of conventional/commercial lithium pouch cells with graphite anode at fast charging conditions of at least 4C (15 minutes), 5C (12 minutes), and 6C (10 minutes) or more, as compared to the slower C1 charge rate (60 minutes). Charging rates C2 (30 minutes) and C3 (20 minutes) may also benefit as well depending on the particular battery involved.

A certain embodiment of the present invention involves applying a magnetic field using one or more permanent magnets positioned in such orientation relative to the battery that magnetic field lines extend in the direction substantially parallel with the of primary Li$^+$ ion flux or transport toward the anode (i.e. substantially normal to the anode surface) during such fast charging to reduce degradation associated with interfacial film fracture at the anode surface and also limit plating (deposition) of metallic lithium at the anode surface, especially from repeated fast charging cycles over time. The permanent magnet can comprise a pair of permanent bar magnets, horseshoe magnet, bored-cylindrical magnets with radial magnetization, and any other suitable permanent magnets positioned relative to the lithium-ion battery in such a manner that magnetic flux lines extend in the direction of primary Li$^+$ ion flux or transport toward the anode to this end. The permanent magnets can be incorporated into a housing or casing of an electronic device such as a cell phone housing, portable computer housing, etc. proximate to the battery or as part of or proximate to a charging holder or charging station relative to which the battery or an EV or other electronic system containing the battery can be positioned during fast charging.

Referring to FIGS. 1a and 1b, a pair of permanent bar magnets 10, 12 are shown positioned on opposite sides of a prismatically "jelly-rolled" lithium-ion pouch battery 20 having terminals 22, 24 such that the magnetic field lines (see arrows) are substantially normal to the graphite anode surfaces. Referring to FIG. 1b, the pouch battery 20 is shown received in a non-magnetic (e.g. plastic) housing or casing 30 having a central pocket that receives the pouch battery 20 and side pockets that receive the bar magnets 10, 12 oriented with the north and south poles as shown.

Another certain embodiment of the present invention involves applying a magnetic field using one or more electromagnets positioned in such orientation relative to the battery that magnetic field lines extend in the direction substantially parallel with the of primary $Li^+$ ion flux or transport toward the anode during such fast charging. The electromagnet can comprise an electromagnet coil extending (e.g. wrapped) around the periphery of the battery, an electromagnet having a core with a pair of opposing north/south poles between which poles the battery is positioned, or other electromagnet configuration in such a manner that magnetic flux lines extend in the direction of primary $Li^+$ ion flux or transport toward the anode to this end.

Referring to FIG. 1c, an electromagnet coil 30 is shown positioned around the periphery of the prismatically "jelly-rolled" lithium-ion pouch battery 20 (like that of FIG. 1a, 1b) having terminals 22, 24 such that the magnetic field lines (see arrows) are substantially normal to the anode surfaces. The electromagnet coil 30 is connected to a conventional DC or AC electrical current source S such that the direction of current flow through the coil 30 is chosen to this end in dependence on the particular battery type and shape. The applied current to the electromagnet can be a constant current, alternating current, or pulsed current by frequency control of the power source to provide at least one of a corresponding constant magnetic field, alternating magnetic field, or a pulsed magnetic field during fast charging. The electromagnet coil 30 can be attached permanently to the battery periphery by providing a non-magnetic casing (e.g. aluminum, plastic, etc.) with coil windings or can be incorporated into a fast charging holder or fast charging station relative to which the battery 20 or EV or other electronic system containing the battery is positioned during fast charging. FIG. 1g schematically shows a similar embodiment using an electromagnet coil.

Figure 1G:
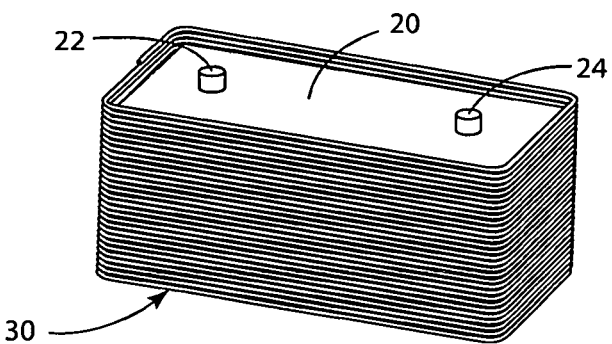
FIG. 1g shows another illustrative embodiment of the present invention using an electromagnet coil.

FIG. 1e schematically shows a lithium-ion battery pack 50 of electric vehicle wherein the battery pack 50 has an electromagnet coil 52 positioned around the periphery of a lithium-ion pouch battery pack 50 such that the magnetic field lines are substantially normal to the anode surfaces of the battery pack, which may contain multiple lithium-ion cells as is known. The coil 30 is energized to provide a direction of current flow through the coil 30 that is chosen in dependence on the particular battery type, shape, and orientation in the battery pack 50. The electromagnet coil 30 can be attached permanently to the battery pack periphery by providing a magnetically non-permeable casing with coil windings and can be energized from the vehicle electronic system when the battery pack is fast charged from the vehicle electrical system.

Application of the magnetic field to the battery pursuant to embodiments of the present invention can be used to control ionic transport by taking advantage of magnetohydrodynamic (MHD) or Lorentz force interactions of moving charged particles in external magnetic field. When the magnetic field is applied in the direction of the diffusion during fast charging according to the invention, the lithium ions flowing parallel to the direction of applied field experience no or minimum Lorentz force. However, any diffusing ions traversing in a transverse direction to the magnetic field are influenced by a convective Lorentz force (FIG. 1d), which improves the diffusion capabilities of the electrolyte and increases the homogeneity of charge distribution over the anode surface.

EXAMPLES

Experimental Section

Electrochemical Analysis: Lithium cobalt oxide/graphite pouch cells (batteries) with a nominal capacity of 20 mAh (PowerStream GM201515) were cycled at room temperature using an MTI BST8-300 mA battery testing station. All pouch cells were initialized by discharging at constant current (CC) with C/10 till 3.0 V, CC charging till 90% SOC (state of charge), and CC discharging till 3.0 V. The pouch cells were allowed to rest for 30 min after each charge/discharge half cycle. After initializing, the following protocol was followed for fast charging of the pouch cells. CC charge till 4.2 V at a desired C-rate (1C-5C), CV (constant voltage) till 90% SOC, rest for 30 min, CC discharge till 3.0 V, and rest for 30 min. This protocol was repeated for 10 cycles. The DCR measurements were performed at the end of each rest period after fast charging. The measured DCR with cycles was adjusted by subtracting the DCR at the slow charging cycle to obtain the DCR variation due to film growth. The pouch cell temperature was closely monitored using an in-built thermocouple with the battery testing station.

Magnetic field source: Magnetic field was applied using a C-shape core electromagnet having a wire coil and a core extending through the coil and terminating in opposing N/S poles. The core material was CR-1010 steel and the windings were AWG22 coated copper wire with 3500 turns. A Kepco KLN-1500 power source was used to modulate the DC current (direct current). Figure if shows a schematic of the C-core electromagnet. A Kepco Series BOP power source can be used to modulate AC current to the electromagnet in a manner to provide an alternating or pulsed magnetic field during charging for purposes of illustration and not limitation.

Disassembly and thickness measurement: The pouch cells were discharged at CC till 2.7 V and held at CV till C/20. The cells were quickly transferred into a glovebox (MBraun, <0.1 ppm $O_2$ and $H_2O$) where they were cut open and the electrodes were carefully separated without damaging the deposited films. The film thickness was measured using a Mitutoyo IP65 micrometer with least count of 1 μm. The samples were always stored inside the glovebox in air tight vials to prevent all possibility of oxidation.

Microstructural and compositional analyses: FE-SEM and EDS analyses were performed using a FEI Teneo LoVac field-emission scanning electron microscope. The samples were transported from the glovebox for the analyses using a specialized vacuum sample holder and were only opened under high vacuum inside the SEM. Both secondary electron and backscattered electron imaging were performed using a 5 kV electron beam. The backscattered image showed a better contrast in the film vs. graphite phases.

Photoelectron studies: XPS was performed using an Amicus XPS system. The samples were transferred in a specialized holder from the glovebox to the XPS unit. Argon sputtering was used to etch the film to perform depth profiling. The survey spectra were deconvoluted using CASAXPS software to get the atomic percentage of the interfacial film.

Figure 2A:
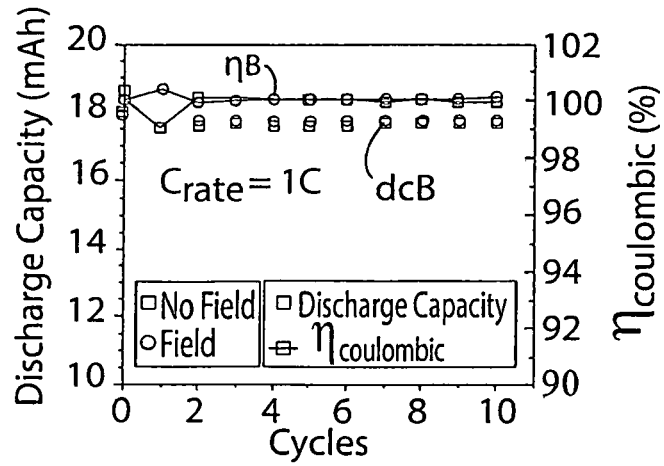
FIGS. 2a-2i provide a comparison of pouch cells charged without and with a magnetic field (B=1.77 kG) over 10 cycles. The discharge capacity and coulombic efficiency of pouch cells over multiple charging rates varying from 1C-5C (FIGS. 2a-2e), capacity gain due to application of magnetic field (FIG. 2f), and DCR (direct current resistance) measurements during rest period after fast charging (FIGS. 2g-2i).
Figure 2B:
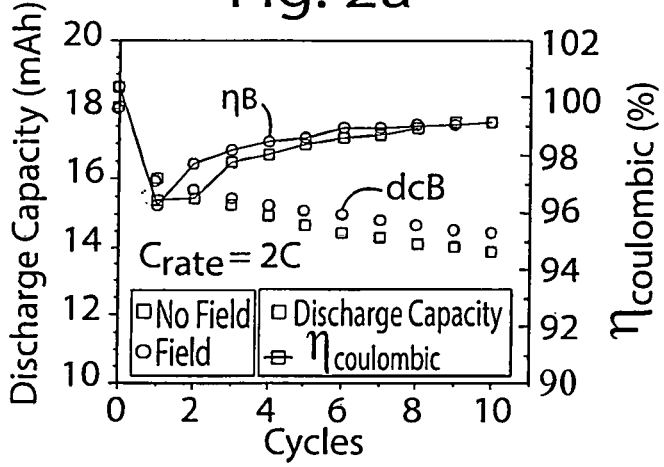
Figure 2C:
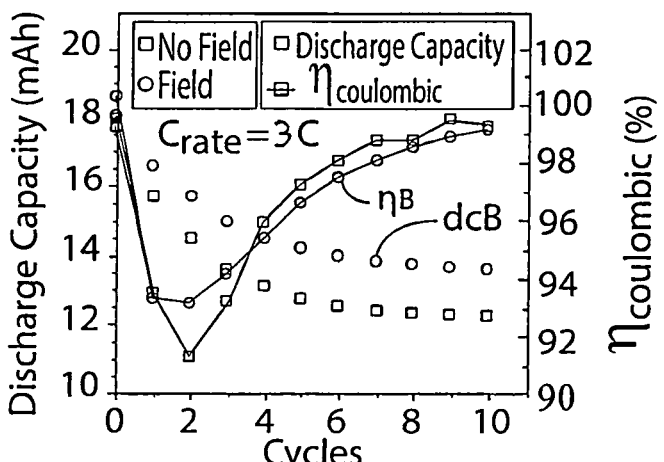
Figure 2D:
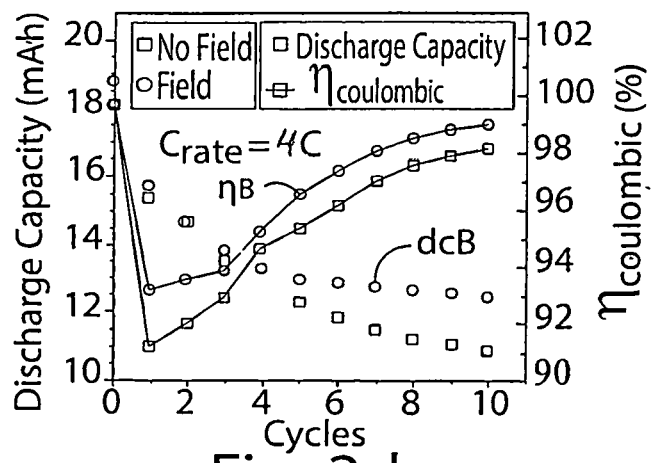
Figure 2E:
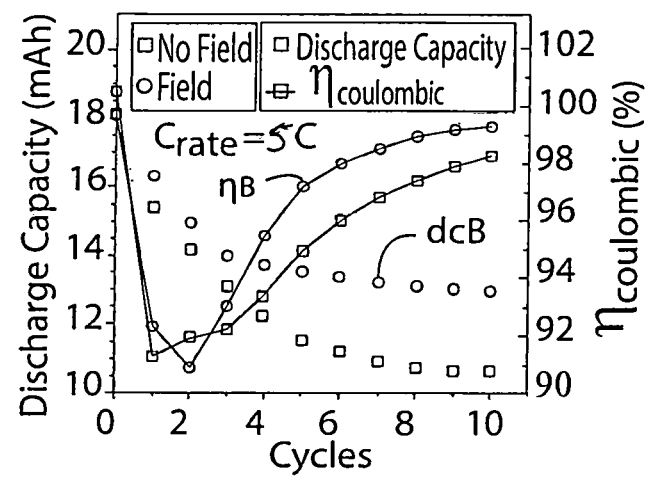
Figure 2F:
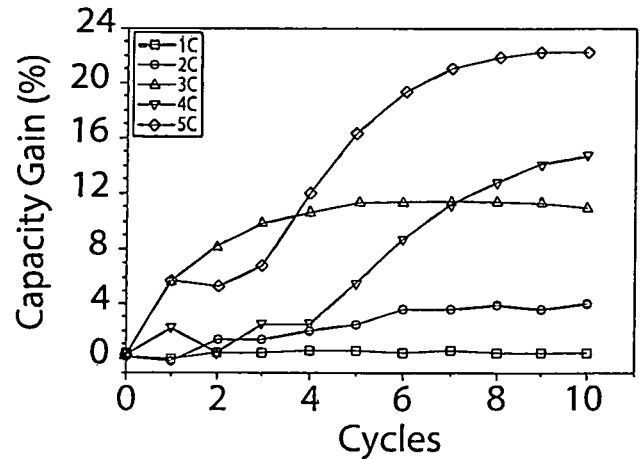

To realize the effect of the MHD force on the interfacial kinetics of fast charging lithium batteries, pouch cells were charged from 1C to 5C over 10 cycles at room temperature both without (B=0 kG) and with magnetic field (B=1.8 kG). The discharge capacity and coulombic efficiency of the pouch cells are plotted in FIG. 2a-2e. At 1C charging, the capacity fade is primarily due to SEI growth, with negligible lithium plating. This can be observed in FIG. 2a in which no significant capacity variation was observed, indicating a uniform lithium flux distribution and insignificant lithium plating at low charging rates. The onset of lithium plating as a dominant degradation mechanism starts from 2C charging onwards (FIG. 2b-2e), as inferred from the coulombic efficiency plot. A sharp depreciation in the coulombic efficiency in the initial cycles indicates a significant loss of lithium inventory, which is known to be associated with lithium plating at the anode surface at the anode/separator membrane interface, and film fracture at higher charging rates. The coulombic efficiency revives because of rapid SEI (solid-electrolyte interface) formation on the plated lithium. The SEI layer encapsulates the plated lithium, thereby creating a potential barrier and minimizing further lithium deposition. As expected, with/without magnetic field, the magnitude of lithium plating and capacity loss was found to increase with C-charging rate. However, with magnetic field during fast charging, higher discharge capacity was observed indicating lower loss of lithium inventory from the degradation mechanisms. Upon comparing the difference in the discharge capacity with/without magnetic field, an increasing magnitude of capacity gain was observed (FIG. 2f) with charging rates, indicating that the MHD effect homogenizes the lithium concentration at the anode/electrolyte interface. A maximum of 22% capacity gain was found at 5C charging rate and 1.8 kG which can substantially reduce the potential for severe degradation mechanisms like lithium plating and film fracture.

Figure 2G:
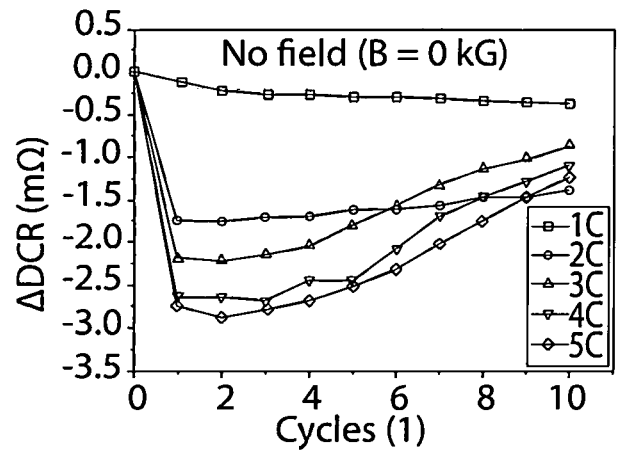
Figure 2H:
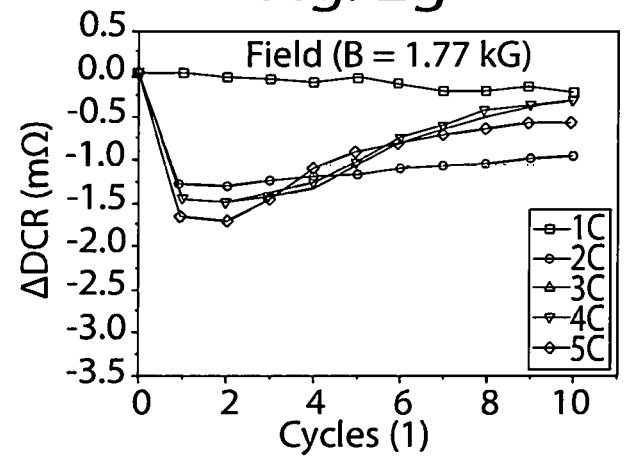
Figure 2I:
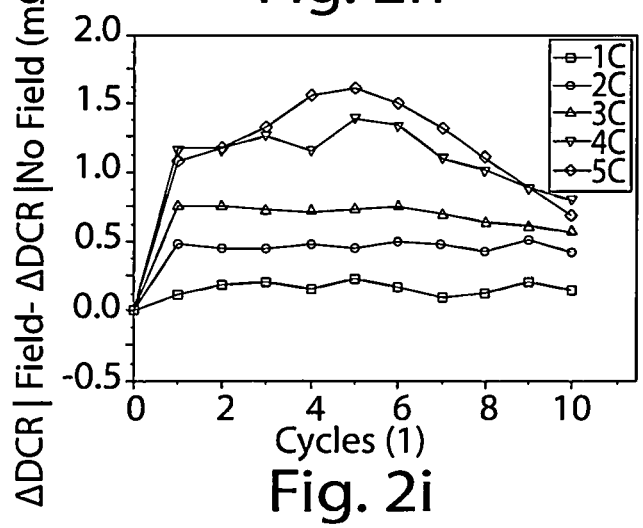

To further support the discharge capacity and coulombic efficiency results, DCR measurements were taken at the end of each rest period after fast charging. In the no field case (FIG. 2g), a sharp depreciation in the resistance was observed in the initial cycles followed by a gradual rise. The initial depreciation of DCR indicates the deposition of an electrically conductive material, like metallic lithium, at the interface upon application of large lithium flux during fast charging. The increase in the DCR over consecutive cycles is due the formation of a thick electrically insulating layer, like lithium compounds in the SEI layer, on top of the conductive lithium metal. The application of external magnetic field during fast charging considerably reduced the DCR loss, indicating diminished lithium plating, which is evident by comparing FIGS. 2g and 2h (as shown in FIG. 2i). The DCR improvement was found to increase with the charging rate, thereby reinforcing the inferences from the capacity/efficiency observations.

To further investigate the influence of MHD forces during fast charging of lithium batteries, the pouch cells were carefully dismantled in a glovebox. The anode thickness with the deposited film was measured using a micrometer. The sample thickness measured were, 137 µm for the pristine anode, 163 µm for 3C charging without field, 160 µm for 3C charging with field, 174 µm for 5C charging without field and 173 µm for 5C charging with field. A reduction in the film thickness of 3 µm for the 3C charging and 1 µm for the 5C charging was established as a resultant of the application of magnetic field during charging. A plausible inference would be that at 3C, the capacity gain from magnetic field is primarily from reduced lithium deposition, while at 5C, from reduction in film deposition and suppression of film fracture, although Applicant does not wish or intend to be bound by any inference or theory herein.

Figure 3A:
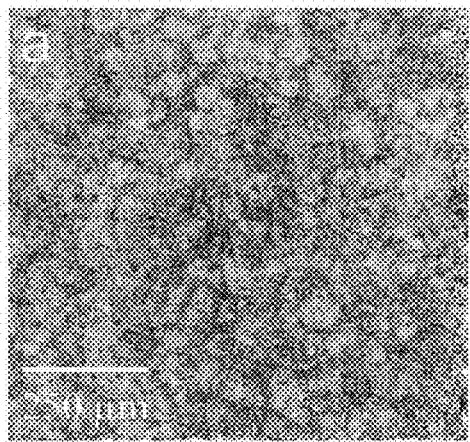
FIGS. 3a-3m are backscattered electron FE-SEM and EDS analysis of the anodic surface subject to fast charging with and without the application of external magnetic field. Shown are SEM images at 3C fast charging without magnetic field (FIGS. 3a-3b), 3C with magnetic field (FIGS. 3c-3d), 5C without magnetic field (FIGS. 3e-3f), and 5C with magnetic field (FIGS. 3g-3h). Shown is EDS mapping for pristine graphite anode (FIG. 3i), 3C without magnetic field (FIG. 3j), 3C with magnetic field (FIG. 3k), 5C without magnetic field (FIG. 3l), and 5C with magnetic field (FIG. 3m).
Figure 3B:
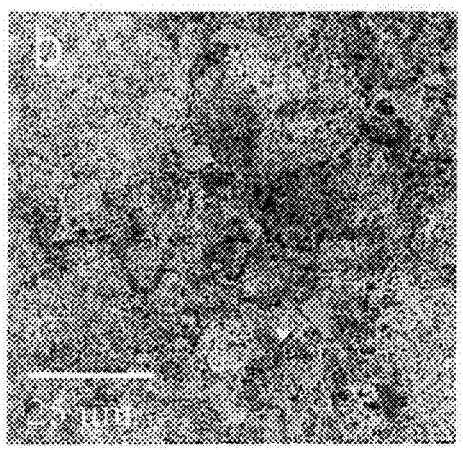
Figure 3C:
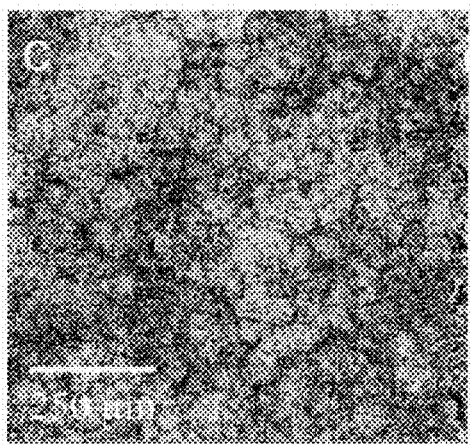
Figure 3D:
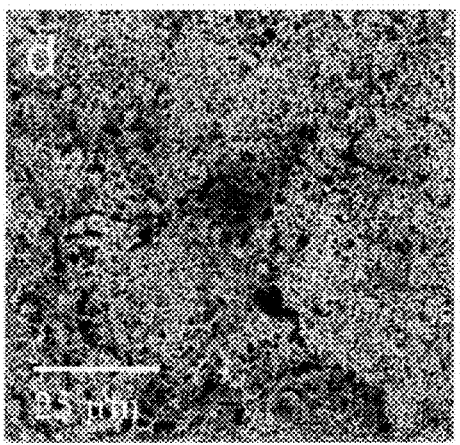
Figure 3E:
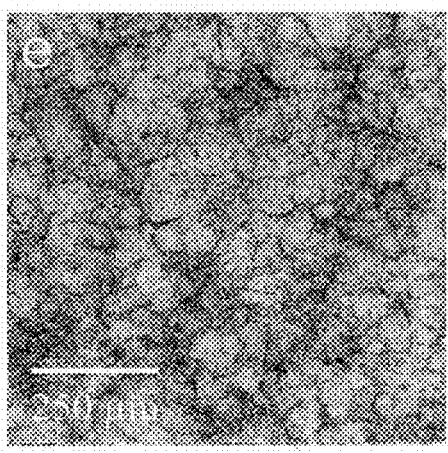

To further investigate, post-mortem field emission scanning electron microscopy (FE-SEM) with Energy Dispersive X-ray Spectroscopy (EDS) was performed (FIG. 3a-3f). In FIG. 3a, a lower magnification backscattered electron (BSE) micrograph is presented for 3C charging without field sample (3C-NF from hereon). The micrograph reveals a uniform dense film deposition with no visible sign of the porous graphite layer beneath. A higher magnification micrograph shows woven mesh-like interconnected network, inferred to be whiskers (or dendrites) of about 1 µm long metallic lithium, covered by a thin film of a nonconductive SEI layer (FIG. 3b). This layer created a bright contrast in the BSE micrograph against the conductive graphite in the background. The micrograph indicates that both the SEI and lithium dendrite network on 3C-NF covers the porous graphite layer underneath. In comparison with the 3C charging with applied field sample (3C-F from hereon), the porous graphite layer can easily be seen even at low magnification (FIG. 3c) and more clearly at a higher magnification (FIG. 3d). Therefore, the MHD effect limited the degradation mechanisms, in particular lithium plating, in the 3C-F sample.

Figure 3F:
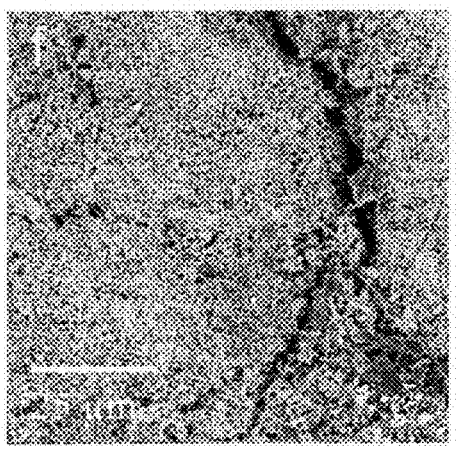
Figure 3G:
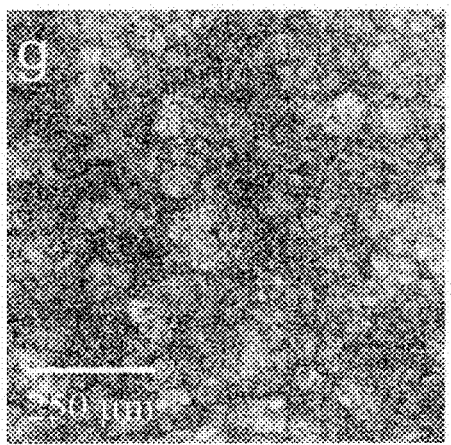
Figure 3H:
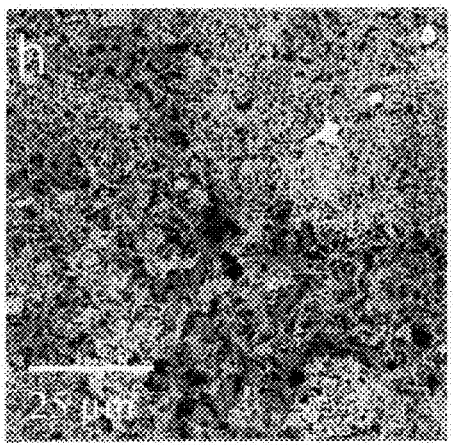

A similar analysis was performed for the 5C samples charged without field (5C-NF from hereon) and with field (5C-F from hereon). The low (FIG. 3e) and high (FIG. 3f) magnification BSE micrographs for the 5C-NF showed a dense deposition of the plated film on the anode surface with no visible indication of the graphite layer below. On the 5C-F sample (FIGS. 3g and 3h for low and high magnifications, respectively), considerably more porous film network was observed than the 5C-NF sample, suggesting a reduced metallic lithium plating. An interesting observation in the 5C-NF sample is that the films were deeply fractured with evident cracks (FIG. 3f). In contrast, the 5C-F sample did not show any indication of cracking (FIG. 3h). The film fracture in the 5C-NF is induced at higher charging rates due to the volumetric strains in the anode particles from rapid lithiation. As the graphite expands, it initiates cracks on the film surface which propagate to fracture the film and release the strain energy of the expanding electrode. A severe loss of capacity is incurred from interfacial film fracture due to renewed formation of SEI on the exposed anode surface. These FE-SEM results are indicative that, in addition to reducing the plating of metallic lithium, the MHD effect also helps to avoid the associated film fractures, hence limiting consequential capacity loss.

Figure 3I:
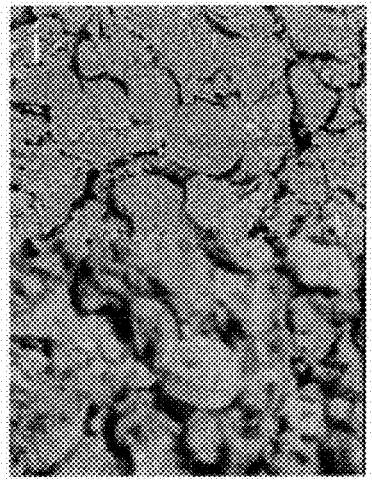
Figure 3J:
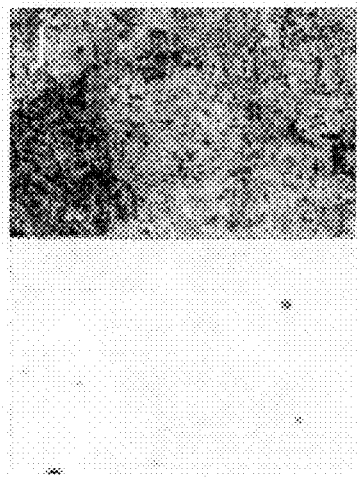
Figure 3K:
Figure 3L:
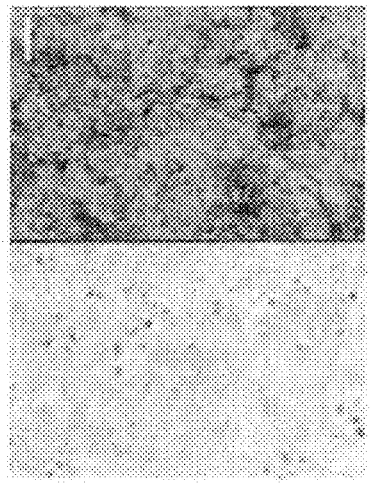
Figure 3M:
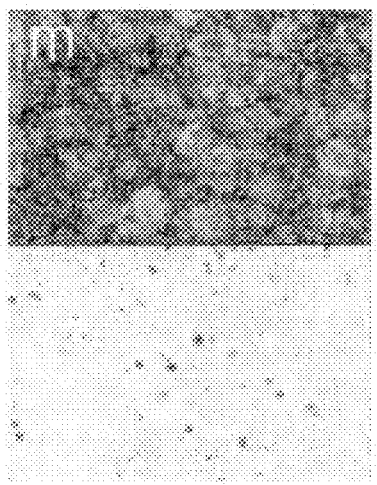
Figure 4A:
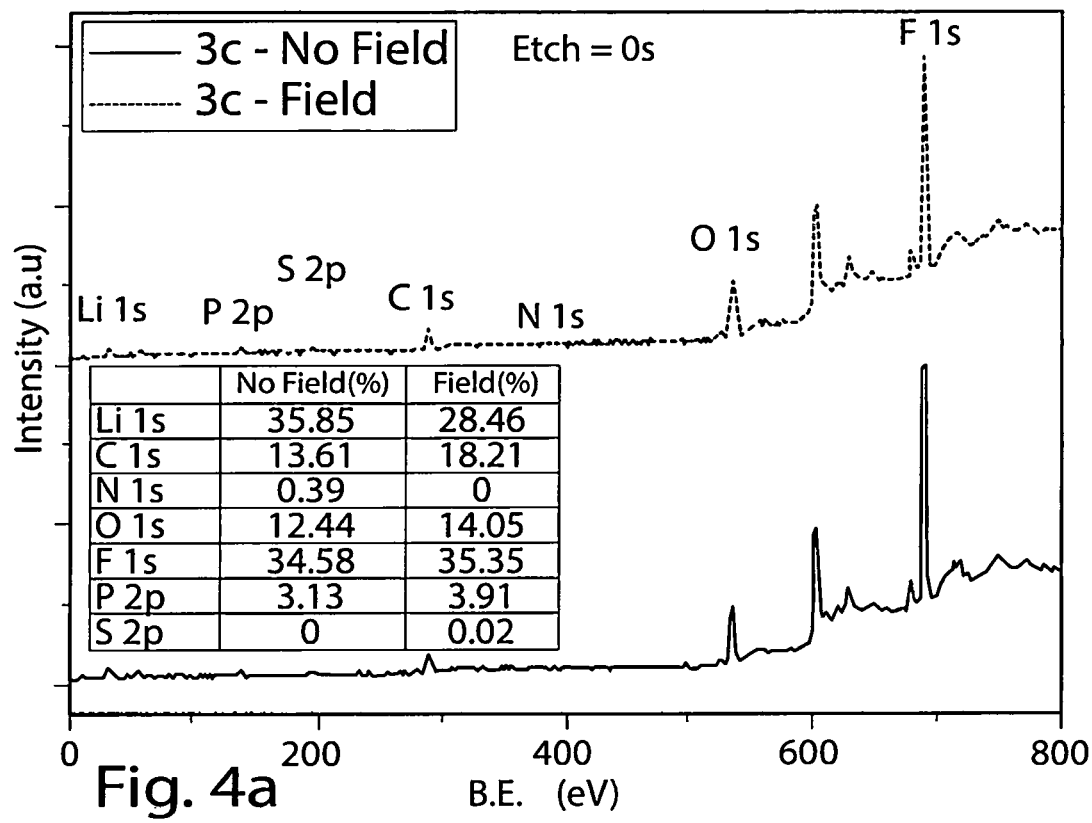
FIGS. 4a-4d are XPS (x-ray photoelectron spectroscopy) survey spectra of the anode for the pouch cells charged with and without magnetic field. XPS for film surface of 3C (FIG. 4a) and 5C (FIG. 4c), and film interior of 3C (FIG. 4b) and 5C (FIG. 4d).
Figure 4B:
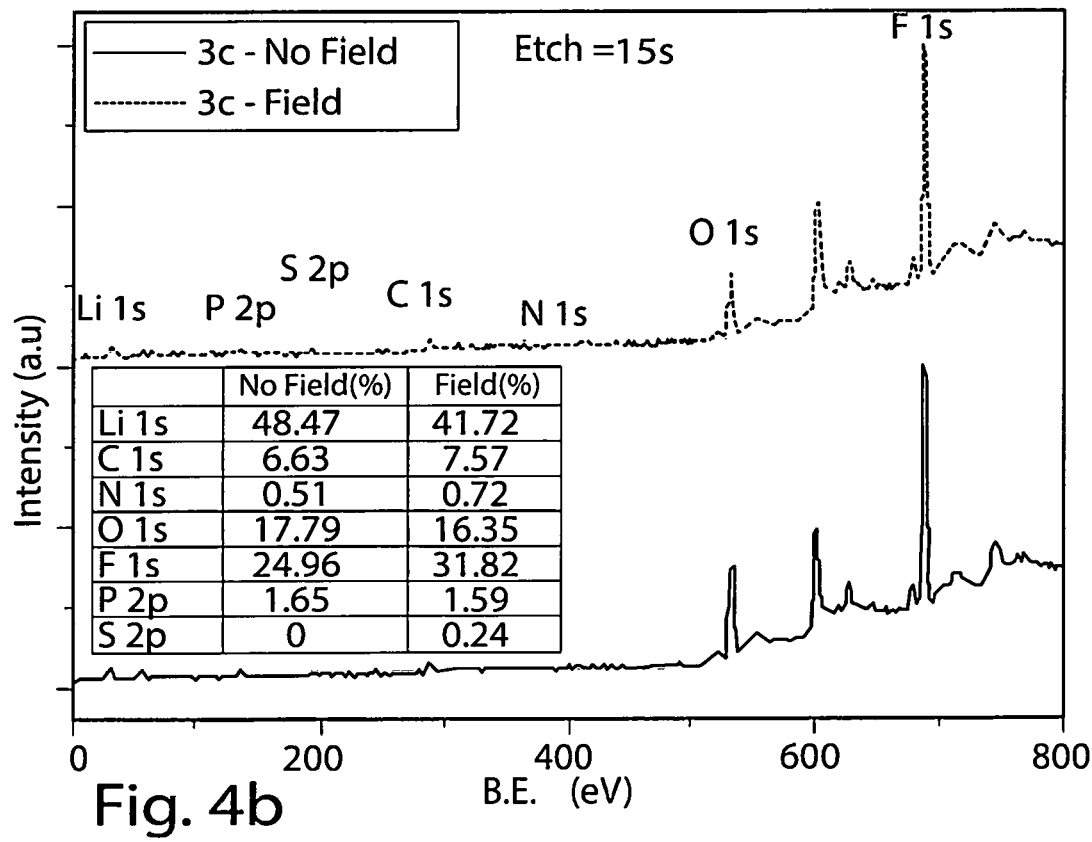
Figures 4C, 4D:
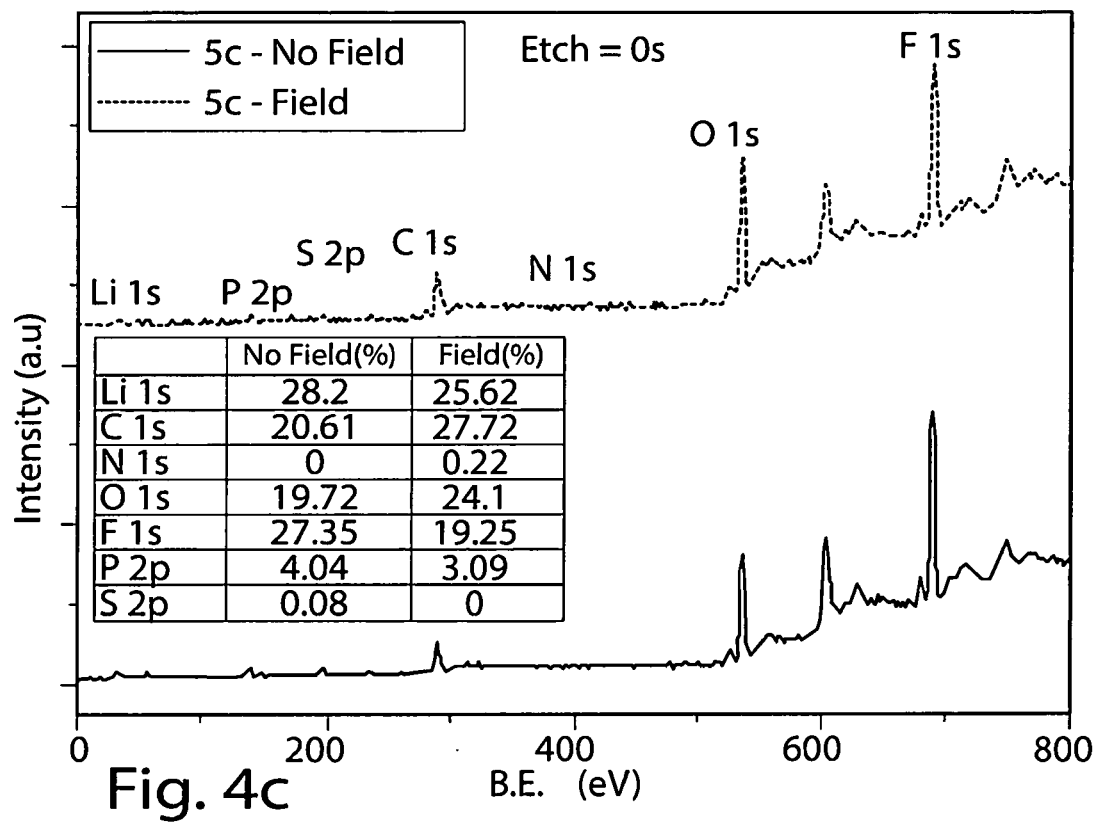

EDS was further used to support the FE-SEM results. Although lighter elements like lithium are not easily quantified using EDS, the elemental mapping of carbon in the samples can be used to gain critical insights into the changes in composition of those lighter elements deposited on the graphite anode. In this approach, samples with more SEI and metallic lithium films will limit the ease of mapping of graphite underneath. Pristine graphite anode is seen in FIG. 3i. Both the 3C-NF and 5C-NF showed less aerial view of the graphite (relatively dark areas in FIGS. 3j and 3l) compared to 3C-F and 5C-F samples (in FIGS. 3k and 3m).

This complements the FE-SEM results (FIGS. 3a-f) and indicates reduced deposition of the films that drive the degradation on the anode/separator membrane interfaces of the samples charged in magnetic field. The observations from the FE-SEM and EDS thus support the inferences from the electrochemical testing discussed in FIG. 2a-2i. The results indicate that the substantial increase in the capacity gains (FIG. 2f) for the 3C-F and 5C-F samples are consequences of reduced lithium plating and minimized (reduced) film cracking.

The surface sensitivity of x-ray photoelectron spectroscopy (XPS) lends the technique to a wide acceptance for analyzing the electrochemical changes in lithium-ion batteries. Therefore, to further support the results obtained via the electrochemical testing, film thickness measurement, FE-SEM and EDS, XPS was performed on the same samples charged at 3C (i.e. 3C-NF and 3C-F) and 5C (5C-NF and 5C-F). Since the pouch cells were fully discharged prior to disassembly, the lithium signals in both the SEI and plated metallic lithium are primarily from the deposited film on the anode surface. Although XPS does not provide a gravimetric analysis of the lithium content in the film, for a constant scanned cross-sectional area, the estimation of the relative lithium content provides a prominent indication of the film chemistry and compositional variations.

The survey spectra of the film in FIG. 4a-4d for the surface (etch=0 s) and film interior (etch=15 s) all show reduced lithium content for the samples charged with magnetic field compared with samples charged without magnetic field. From FIGS. 4a and 4b, the lithium content on the surface and interior of the 3C-F samples were reduced by 20.6% and 13.9%, respectively, compared to those of the 3C-NF samples. Similarly, from FIGS. 4c and 4d, the surface and interior of the 5C-F samples were reduced by 9.2% and 24.1%, respectively, compared to 5C-NF.

The lower reduction of lithium content on the surface of the 5C samples (FIG. 4c) is likely a consequence of the cracking of the surface of the 5C-NF samples reported in FIG. 3f. In general, these values indicate decreased loss of lithium, and agree with the trend reported for capacity gain due to charging in magnetic field in FIG. 2f.

Having confirmed that fast charging in magnetic field reduces anode degradation mechanisms, an investigation into the dependence of fast charging on different applied magnetic field strengths was initiated. By charging the pouch cell at 3C and 5C over 10 cycles in magnetic field strengths of 0, 1.2, 1.8 and 3.1 kG, a trend was observed in which electrochemical performance initially increases and afterwards approaches saturation (FIG. 5a-5f).

Figure 5A:
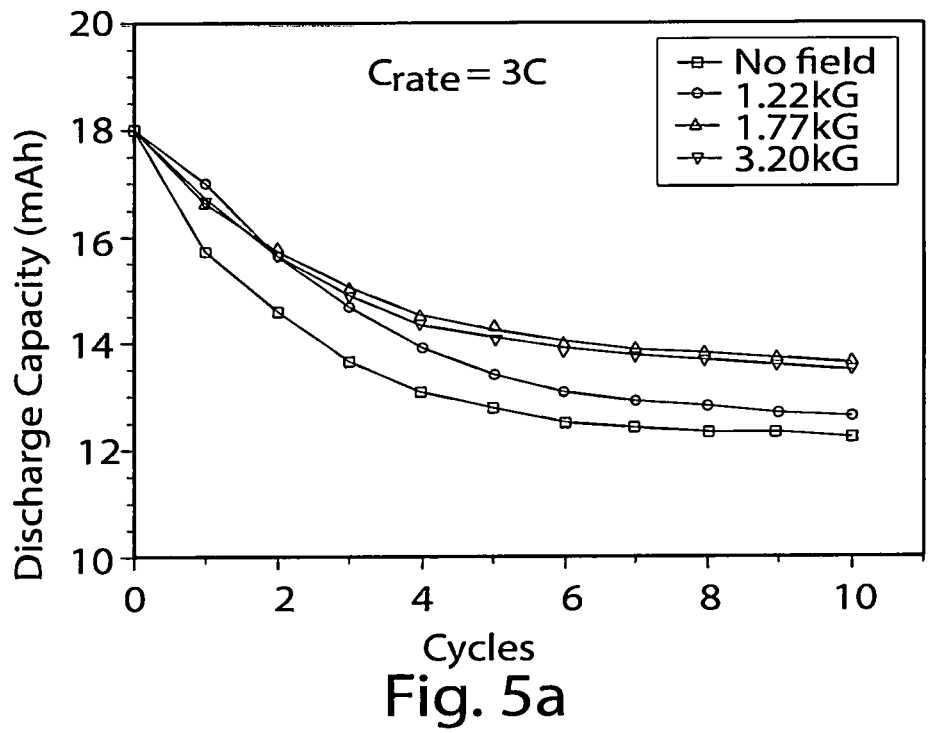
FIGS. 5a-5f show the effect of magnetic field variation on the electrochemical performance of lithium batteries shown as discharge capacity (FIG. 5a, 5b), coulombic efficiency (FIG. 5e, 5f), and ΔDCR (FIG. 5c, 5d) for pouch cells charged at the indicated $C_{rate}$ values.
Figure 5B:
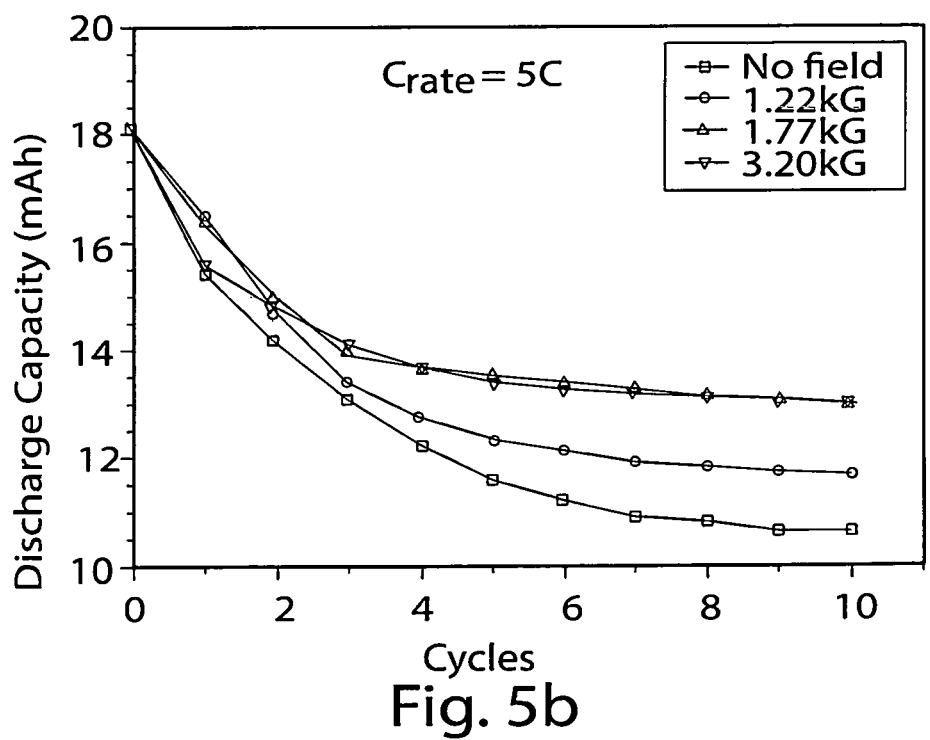
Figure 5C:
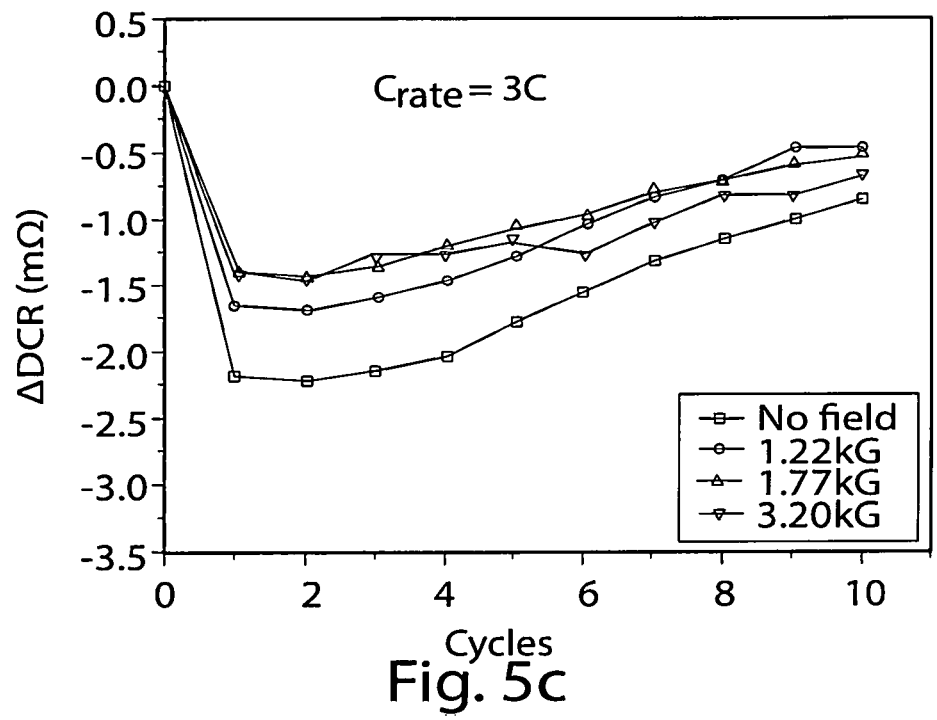
Figure 5D:
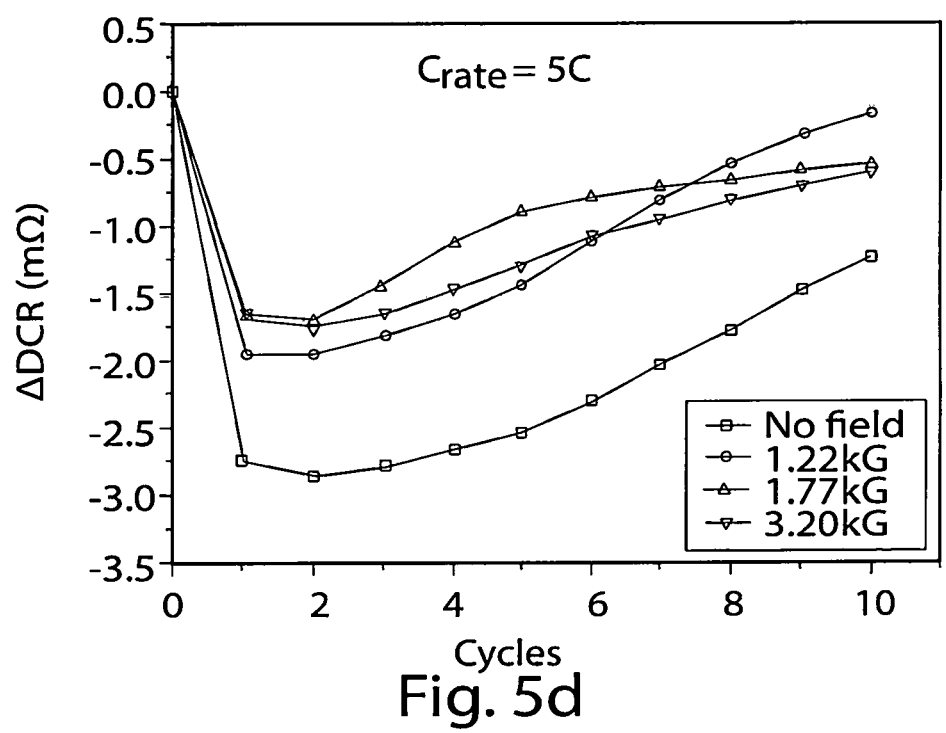
Figure 5E:
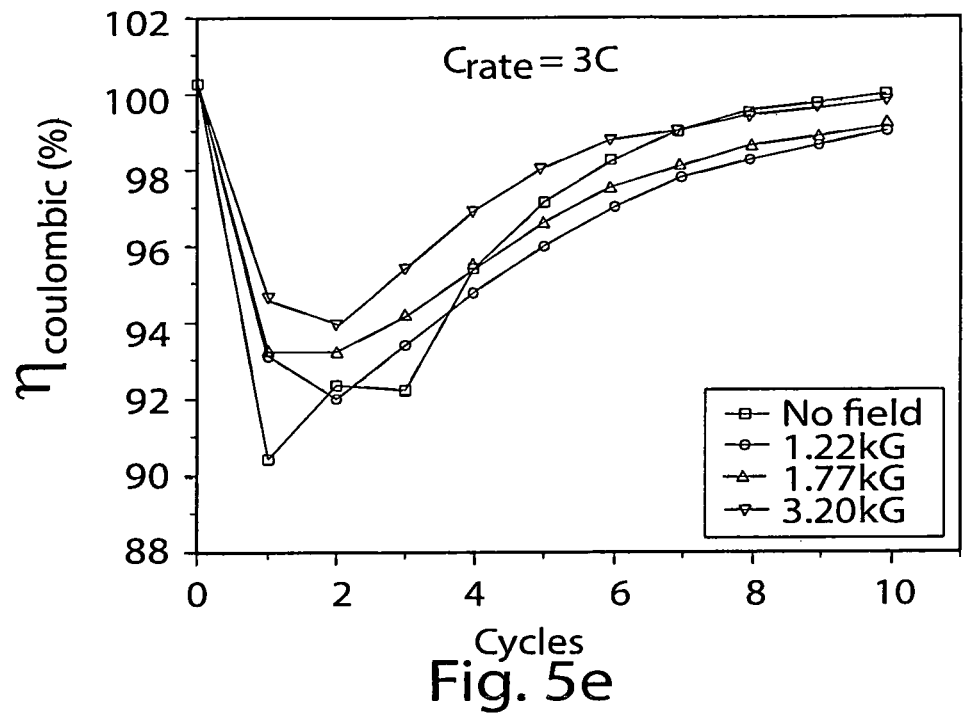
Figure 5F:
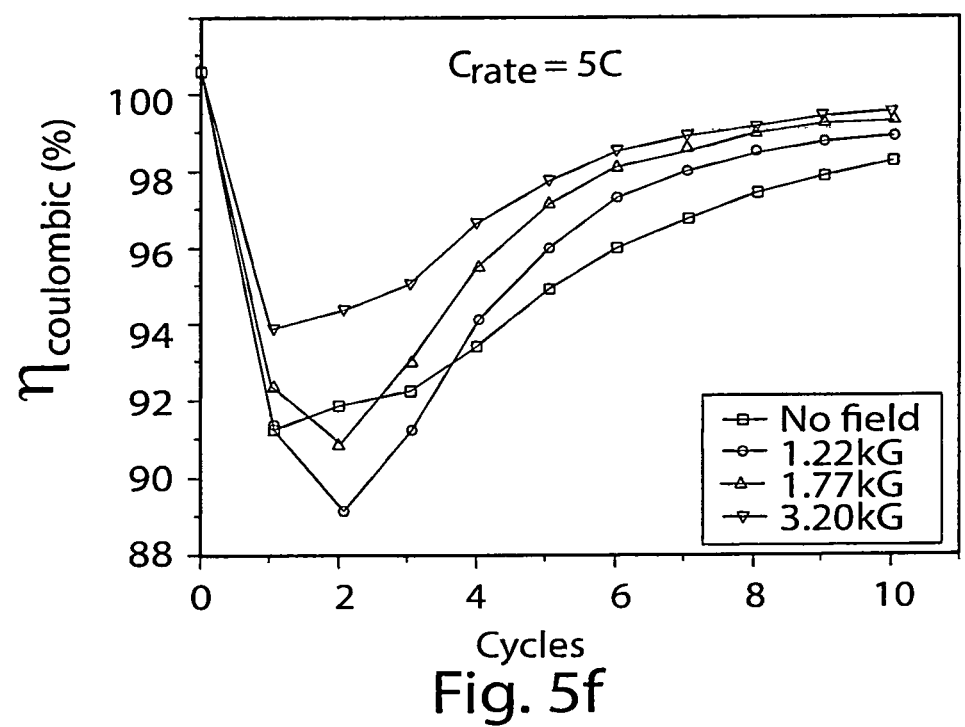

The discharge capacity plots reveal a sudden and sharp rise for 3C charging with field, compared to 3C without field (FIG. 5a), as well as 5C charging with field, compared to 5C charging without field (FIG. 5b). This indicates a strong coupling between ionic flux diffusion and applied magnetic field, resulting from the MHD effect. This improvement in capacity is supported by a rise in ΔDCR and coulombic efficiency, indicating a reduced lithium plating (FIGS. 5c-f). The rise in the ΔDCR loss indicates a reduction in the conductive lithium deposition with increment in the applied field strength. The improvement in the coulombic efficiency further indicates a lower electrochemical degradation at the end of each charge cycle. The effect is more dominant at 5C charging compared to 3C charging because the 5C charging condition exhibits film fracture along with lithium plating, as observed from the microstructural analysis (FIG. 3a-3m). For the pouch cells used in the present analysis, the field strength for saturating electrochemical performance is found near 1.8 kG. The saturation in the electrochemical performance could be related to a peak in the homogenization effect of the convective ionic flux due to the MHD, such that the transversely flowing species are not homogenized any further with the application of magnetic field. Any further degradation would be a consequence of large but homogenized ionic transport at the anode/separator interface. The peak in the effect of magnetic field is beneficial since it indicates that low magnetic field strength, such as can be efficiently produced with permanent magnets or a fewer turns of electromagnet coils, is enough to maximize the impact of the MHD effect in enhancing electrochemical performance. This also limits the cost of introducing magnetic field in the overall cost of lithium-ion batteries.

The Examples of embodiments of the present invention demonstrate that the electrochemical performance of fast charging commercial lithium-ion batteries with anodes comprising graphite can significantly be improved by coupling electrochemistry with magnetism. This improvement is a result of homogenization of transversely diffusing ionic flux at the anode/separator interface by Lorentz forces via the MHD effect. Consequently, degradation mechanisms, like lithium plating, SEI growth and film fracture, on the anode surface are minimized. An improvement in the discharge capacity was observed upon application of magnetic field on LCO/C pouch cells, with capacity gain increasing with C-rate up to a maximum of about 22% at 5C charging rate. In-situ DCR measurements indicated a reduced lithium deposition due to the application of magnetic field, which was validated via post-mortem thickness, FE-SEM/EDS and XPS analyses. The FE-SEM results also revealed that film fracture seen for 5C charging conditions without magnetic field, was not observable for 5C charging conditions with magnetic field. It was also observed that capacity gain with increase in the strength of the applied magnetic field saturates—a consequence of reaching a maximum in the homogenization of the lithium flux at the anode surface due to the applied magnetic field.

Although certain illustrative embodiments of the present invention have been described above, those skilled in the art will recognize that changes and modifications can be made thereto without departing from the spirit and scope of the present invention as set forth in the appended claims.

We claim:

1. A method of charging an assembled lithium-ion battery having an anode comprising graphite wherein the assembled lithium-ion battery is repeatedly fast charged during use, comprising applying a magnetic field relative to the assembled lithium-ion battery at each fast charging operation when charging occurs at a charging rate that can result in lithium plating wherein magnetic field lines extend in a direction of lithium ion flux toward the anode during charging to reduce lithium plating.

2. The method of claim 1 including positioning one or more permanent magnets relative to the assembled lithium-ion battery at each fast charging operation to apply the magnetic field lines that extend generally parallel to the direction of movement of lithium ion flux toward the anode during charging.

3. The method of claim 1 including positioning an electromagnet relative to the assembled lithium-ion battery at each fast charging operation to apply the magnetic field lines that extend generally parallel to the direction of movement of lithium ion flux toward the anode during charging.

4. The method of claim 3 wherein the electromagnet comprises an electromagnet coil that extends about a periphery of the assembled lithium-ion battery.

5. The method of claim 1 wherein the assembled lithium-ion battery is fast charged at each fast charging operation relative to a slower 1C charging rate for the battery.

6. The method of claim 1 wherein the magnetic field is constant, alternating, or pulsed.

7. The method of claim 1 that reduces or eliminates degradation of the anode from repeated fast charging.

8. The method of claim 7 which reduces or eliminates fracture of an SEI interfacial layer.

9. The method of claim 7 which reduces or eliminates lithium deposition.

10. A lithium-ion battery having an anode comprising graphite and having a device positioned externally relative to the lithium-ion battery and receiving the lithium-ion battery in a receptacle thereof to apply a magnetic field to the lithium-ion battery at each of repeated fast charging operations during use of the lithium-ion battery when charging occurs at a charging rate that can result in lithium plating so that magnetic field lines extend in a direction of movement of lithium ion flux toward the anode during charging to reduce lithium plating.

11. The battery of claim 10 wherein the device comprises one or more permanent magnets positioned relative to a periphery of the lithium-ion battery received in the receptacle for each fast charging operation to apply the magnetic flux lines that extend generally parallel to the direction of movement of lithium ion flux toward the anode during charging.

12. The battery of claim 10 wherein the device comprises an electromagnet positioned relative to a periphery of the lithium-ion battery received in the receptacle for each fast charging operation to apply the magnetic flux lines that extend generally parallel to the direction of movement of lithium ions toward the anode during charging.

13. The battery of claim 12 wherein the electromagnet comprises an electromagnet coil that extends about the periphery of the lithium-ion battery received in the receptacle.

14. An electronic device or system that includes the battery of claim 10 as a power source.

15. An electric vehicle having one or more batteries of claim 10 as a power source.

16. The method of claim 1 wherein fast charging occurs to a upper set battery voltage for the assembled lithium-ion battery.

17. The method of claim 16 wherein the set upper battery voltage for the assembled lithium-ion battery is 4.2 volts.

18. The method of claim 1 wherein the charging rate is 2C or more.

\* \* \* \* \*